Feb. 7, 1967 W. GITH 3,303,419
METHOD AND DEVICE FOR MEASURING THE LENGTH OF
RUNNING TEXTILE THREADS
Filed July 5, 1963 4 Sheets-Sheet 1

INVENTOR
Walter Gith

Feb. 7, 1967  W. GITH  3,303,419
METHOD AND DEVICE FOR MEASURING THE LENGTH OF
RUNNING TEXTILE THREADS
Filed July 5, 1963  4 Sheets-Sheet 3
FIG. 3
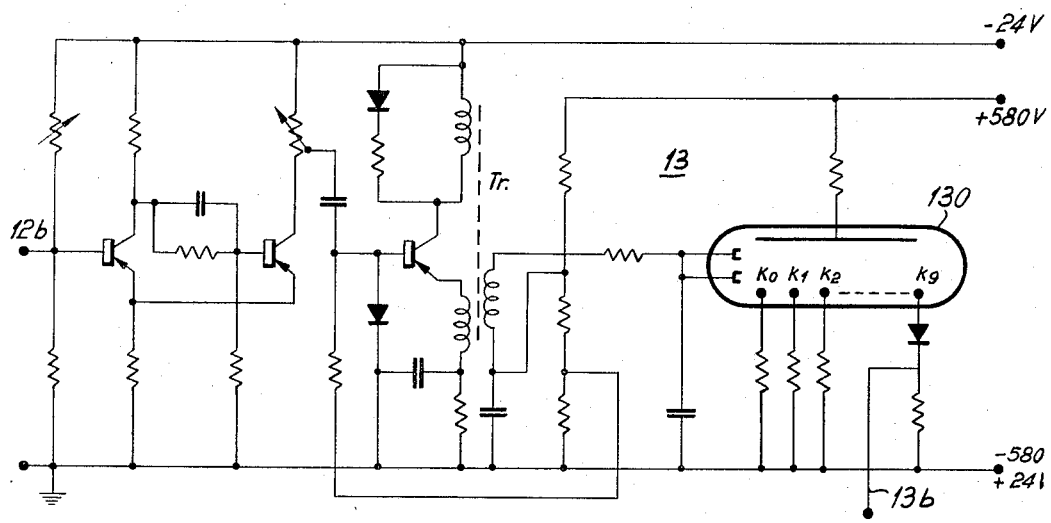
FIG. 5
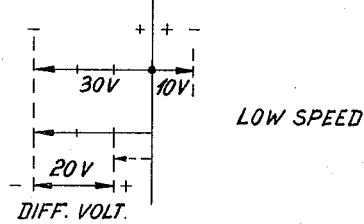
LOW SPEED
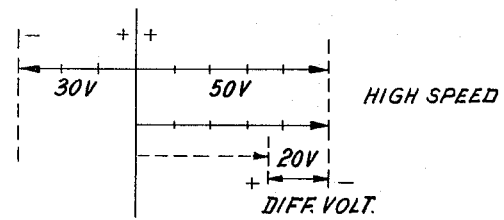
HIGH SPEED
INVENTOR
Walter Gith United States Patent Office 3,303,419
Patented Feb. 7, 1967

3,303,419
METHOD AND DEVICE FOR MEASURING THE LENGTH OF RUNNING TEXTILE THREADS
Walter Gith, Monchen-Gladbach, Germany, assignor to Walter Reiners, Monchen-Gladbach, Germany
Filed July 5, 1963, Ser. No. 293,004
Claims priority, application Germany, July 10, 1962, R 33,102
11 Claims. (Cl. 324—71)

My invention relates to methods and means for measuring the travelling length of textile or other nonmetallic, flaccid material and, in a more particular and preferred aspect, to measuring the length of running textile filaments, yarn and other threads.

In textile manufacture the length of travelling textile thread material has heretofore been measured by causing the thread to turn the input roller of a counting mechanism so that the number of revolutions constitutes a measure of the length passing by the counter. The results thus obtained are rather inaccurate.

It is an object of my invention to readily afford measuring the length of running textile thread material at a much higher degree of accuracy and reliability.

Another object of the invention is to achieve improved accuracy of measurement without imposing upon the thread or other material any mechanical forces as may cause stretching or otherwise impairing the material, and without affecting the appearance or constitution of the material in any other manner.

Still another object of my invention is to secure high accuracy of length measurements regardless of the travelling speed of the material and even at high travelling speeds at which slippage is apt to occur with the mechanical counting devices heretofore employed.

To achieve these objects, and in accordance with a feature of my invention, I apply discrete fugitive and self-expiring markings at a given mutual distance to the travelling thread by adding each time one of such fugitive markings at a given location to the thread when the precedingly applied marking has travelled through the given distance, and I then sense and thereby count the number of markings thus applied.

According to another feature of my invention, the fugitive markings added to the thread in the above-mentioned manner are of the electrically active type and are applied as well as sensed by proximity action and hence without mechanical contact engagement with the thread. Such electrically active or field-producing discrete markings are obtained preferably by intermittently applying an electric charge to the thread. While such a charge decays rapidly to zero, its effective lifetime, manifested by the existence of a corresponding electric field around the marked thread location that can be electrically sensed, persists sufficiently long to reach the sensing or counting location. Another way of producing such fugitive marks is to apply to the thread a radioactive isotope of a correspondingly short half-life.

The number of the self-expiring markings that have passed through the measuring distance need only be multiplied with the length of that distance in order to indicate the total length of thread measured. For example, if the measuring distance is exactly one yard (or one meter), the number of markings counted directly indicates the length in yards (or meters). The measuring results can then be utilized in the same manner as in the heretofore conventional methods, such as for controlling the permanent marking of a given greater length of the material for severing the thread when it has reached a predetermined total length, for stopping the drive of a textile machine when the running thread has reached a given total length, for signalling or controlling the exchange of the thread-supplying or receiving cans used in stretching and carding operations, for controlling the operation of heat sources such as used for polymerizing processes, and other operations.

It has become known to measure the length of iron wires by applying magnetic marking pulses to the wire. Such magnetic pulses, however, cannot be applied to textile, at least not without adding material that impairs or modifies the texture of the material. Other marking means, such as color spots, cannot be employed for measuring the length of textile threads because they would require subsequent cleaning operations which can hardly be performed without stretching or shrinking the thread and which would also greatly affect the accuracy of the measuring results.

As mentioned, the invention utilizes the application of radiative or field-producing markings of short life-time such as radioactive isotopes of short half-life or by applying electric charges. Preferably employed are electric charges caused by local ionization of the thread.

As a rule, the method according to the invention is performed as the yarn travels at constant speed to or from a fabricating location in textile machinery. Excessive changes in travel speed or stoppage of the thread may result in faulty measurement. For example, when the machinery is switched to threading or creeping speed or temporarily stopped, the individual markings shrink in length and increase in width. At the same time, the intensity of the individual markings may change with an increase in travel speed. Both effects may render it difficult to accurately sense or read-out the markings at the end of the measuring distance. For eliminating such speed-responsive errors, it would be desirable to keep the measuring distance as small as feasible so that the measuring error remains small even at low thread travel speeds.

When the speed of the yarn becomes temporarily zero by stoppage of the machinery, the mark just previously applied also stops at some location within the measuring distance. Due to the short life of the mark it may then happen that the mark has expired when the machinery is again switched on. As a result, some of the yarn length travelled previous to application of the expired mark is not counted. For minimizing any such error, it would likewise be desirable to make the measuring distance very small.

On the other hand, if the measuring distance is always kept very short, another disadvantage is encountered. That is, the shorter the measuring distance, the more often will minute sensing tolerances become cumulatively effective. For example, with a sensing tolerance or uncertainty of $\frac{1}{10}$ millimeter, the error limit is 1 per mil for a measuring distance of 100 millimeters. A measuring error within this range is several orders of magnitude smaller than that best obtainable with the measuring methods heretofore known. However, if for avoidance of the above-mentioned faults, the measuring distance is reduced to only 10 millimeters, a sensing tolerance of $\frac{1}{10}$ mm. would result in an error range of 1%. Although this is still better than with the known methods, the reduction in accuracy can be avoided to a great extent if, according to another feature of my invention, the measuring distance is made variable or selective in dependence upon the travel speed of the material being measured, namely so that the measuring distance and consequently the mutual spacing between consecutive markings is made larger with increasing thread travel speed.

According to another feature of my invention, such a variation in measuring distance in dependence upon speed can be effected, by shifting the sensing location relative to the location where the markings are applied, or vice versa. Preferably however, I provide a plurality of predetermined measuring distances of respectively different lengths and employ them selectively, in dependence upon the travel speed, for realeasing the marking signals at the starting point. This can be done in such a manner that when the thread material exceeds a predetermined speed value, a larger measuring distance is automatically adjusted and when the travel speed drops below a given value, a smaller measuring distance becomes effective. The ratio of the respective measuring distances is preferably an integral number. In this case, when a shorter measuring distance is effective, a fractional number corresponding to the length ratio of the measuring distances can be counted. For example, if the length ratio of two measuring distances is 1:10, only each tenth marking is counted when the shorter measuring distance is being used.

For performing the above-described method, and in accordance with further features of my invention, I provide an apparatus which comprises a marking device for producing the self-expiring markings on the thread material, and one or more receiving sensors mounted along the thread travel path at given respective distances from the mark-applying location, each sensor being connected with the marking device for controlling it to produce new markings and being also connected with a counting device. If a plurality of sensing locations are provided, it is of advantage to connect a frequency divider between the counting device and the one or more sensors that are more closely spaced from the mark-producing device. For example, if the apparatus possesses two sensing locations spaced 100 mm. and 1000 mm. respectively from the marking device, then the frequency divider is connected between the counting device and the sensor of 100 mm. spacing, and this frequency divider has a division ratio of 10:1 so as to pass the signals from the 100 mm. sensing location to the counting device only in that ratio. Consequently, only each tenth marking sensed at the 100 mm. location will cause the counting device to advance one counting step.

To prevent the counting device in such an apparatus from being actuated more than once by a single marking as it passes sequentially through the mutually spaced sensing locations, it is further preferable to connect selective switching means between the respective sensing locations and the counting device so that the counting device can receive only the signal pulses coming from a single selected sensor. Since the setting of the selector switch means must be changed whenever the apparatus is switched from one to another measuring distance depending upon the travel speed of the material, it is further preferable to provide control means which automatically set the selective switch means in dependence upon the number of sensed marking pulses counted per unit time (pulse sequence frequency). According to another, more specific feature of the invention, such control of the selector switch is effected by means of a voltage comparator network which compares a reference voltage, adjusted to a desired constant value, with a pilot voltage supplied by an integrating member and proportional to the pulse sequence frequency, the difference voltage furnished by the comparator being used for controlling the sensor selecting switch means. Preferably a bistable flip-flop network triggered by the difference voltage is used for controlling the switching from one to another sensor.

The above-mentioned and other objects, advantages and features of my invention, said features being set forth with particularity in the claims annexed hereto, will be apparent from, and will be described in, the following with reference to the embodiment of a thread-length measuring apparatus according to the invention illustrated by way of example on the accompanying drawing in which:

FIG. 1 is a schematic block diagram of the apparatus.

FIG. 2 exemplifies a circuit diagram of a selective switching stage which forms part of the apparatus shown in FIG. 1.

FIG. 3 is a schematic circuit diagram of a frequency divider, also part of the apparatus of Fig. 1.

FIG. 5 is an explanatory graph relating to the operation of the apparatus.

The same reference characters are used in all illustrations for the same components respectively.

Figure 1:
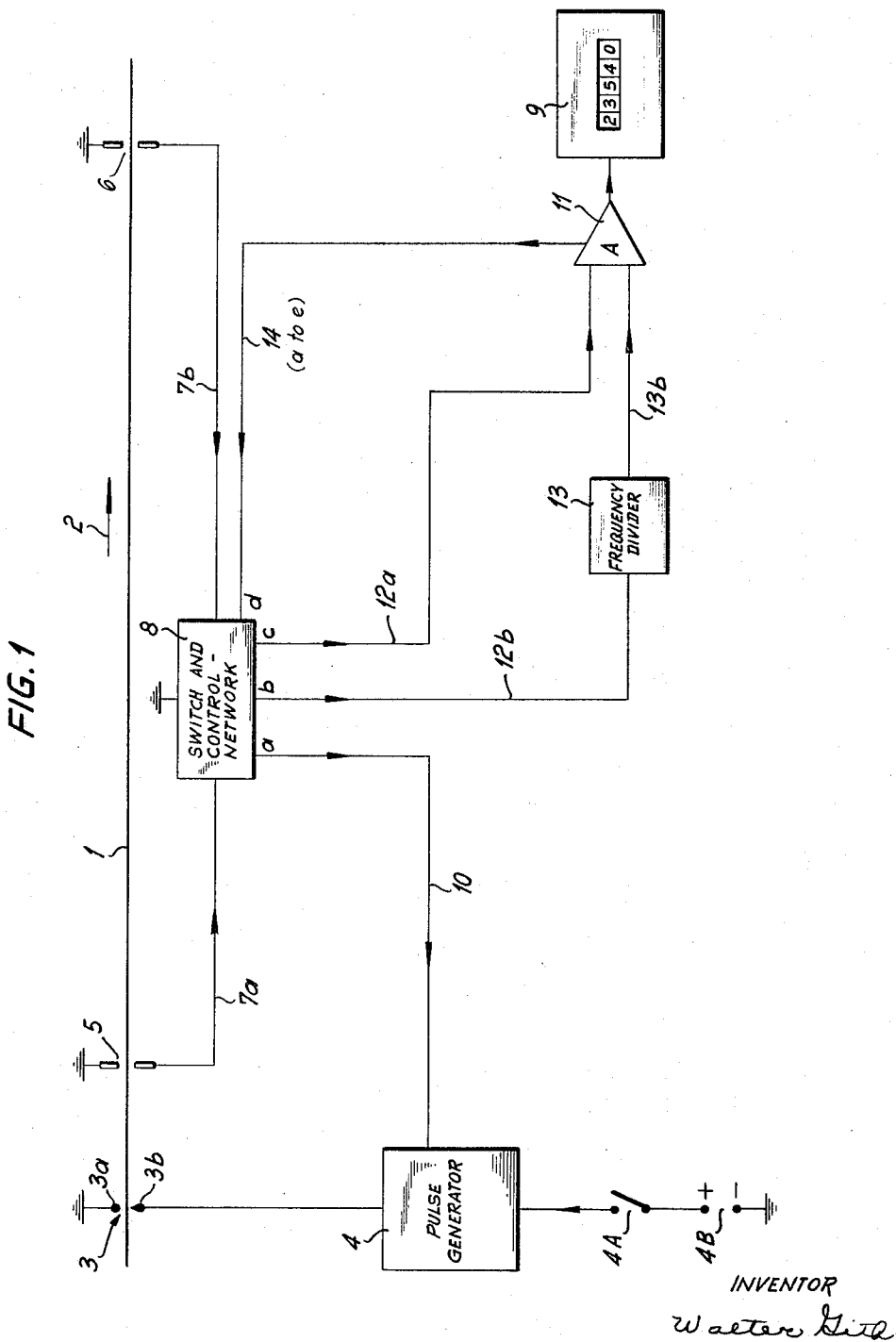

As shown in FIG. 1, the textile thread 1 travels in the direction of the arrow 2 past a mark-applying device 3 and thence past two sensors 5 and 6 which are spaced two different distances respectively from the location of the device 3. The mark-applying device 3 operates to locally ionize the thread 1 during its travel. It is shown to comprise two electrodes 3a and 3b of which the electrode 3a is grounded and the electrode 3b is connected to a high-voltage pulse generator 4. One of the electrodes is pointed and directed toward the thread 1 to produce an electric corona-type discharge which ionizes the air in the immediate environment and also the spot of the thread located at that moment between the two electrodes.

Applicable as a pulse generator, for example, is a conventional video pulse generator as employed in television receivers, in connection with a high-voltage rectifier from which the ionizing pulses are applied to the discharge gap between electrodes 3a and 3b. However, other commercially available high-voltage D.C. pulse generators are likewise applicable, such as a shock-excited oscillator with a rectifier to furnish a one-shot pulse for each trigger signal. In practice, direct voltages of approximately 10 kv. have been found satisfactory, although higher voltages, for example 20 kv. to 100 kv. are likewise well suited. The results were found to be independent of the type or particular textile material of thread being measured.

An apparatus of the illustrated type is preferably employed in conjunction with a textile fabricating machine, for example a yarn-package winding machine. Consequently the thread 1 according to FIG. 1 may run toward a winding machinery. When the machinery is switched on, the main switch 4A of the measuring apparatus is closed simultaneously. The pulse generator 4 then is energized from the terminals 4B of the current supply and passes a short high-voltage pulse upon the electrode 3b of the marking device 3. Thus the running thread 1 is locally ionized in the manner described above. The electrically polarized (charged) spot on thread 1 travels with the thread sequentially through the read-out locations at sensors 5 and 6. Each of these sensors comprises two metal plates between which the thread 1 passes without touching either plate. The two plates are connected in a control circuit 7a or 7b. As soon as the ionized marker passes between the two metal plates at a sensing location, an ionized and conducting air bridge is formed so that the appertaining control circuit is closed. This passes a control pulse to a selector switch 8 and thence through further circuit components to a counting mechanism 9. The same pulse passes from the selector switch 8 through a line 10 to the pulse generator 4 where it releases another high-voltage pulse which causes the marking device 3 to impose a new ionization spot upon the running thread. The selector switch 8 operates to render one of the two sensors 5, 6 ineffective at a time so that one and the same ionized spot of the thread can cause an operation of counter 9 and pulse generator 4 only when the spot travels by a selected one sensing location. Selector switch means capable of such performance will be described below with reference to FIG. 2.

Figure 4:
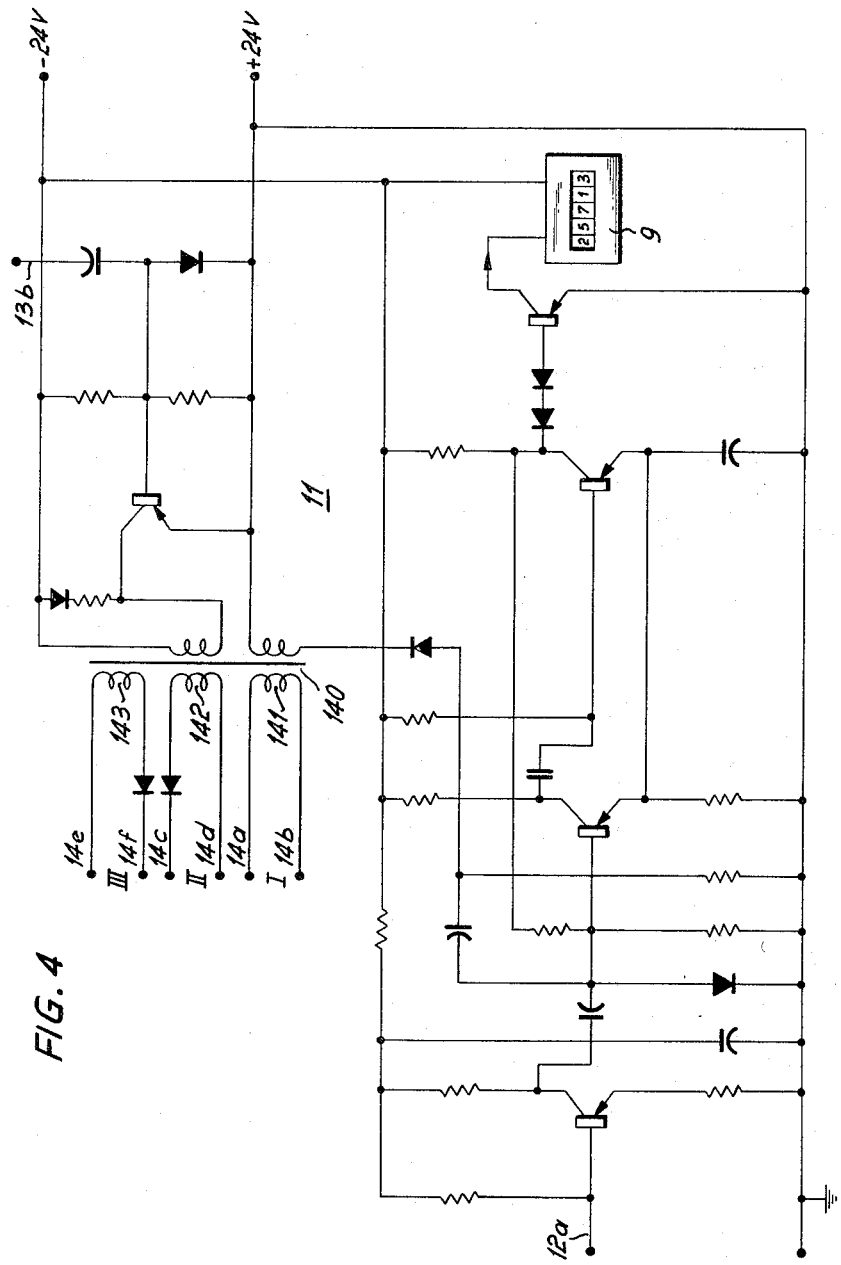
FIG. 4 shows schematically the circuit diagram of a pulse amplifier in the same apparatus.

As is also apparent from FIG. 1, the pulses from sensors 5 and 6, separated in the selector switch 8, pass through respectively different lines to the counting mechanism 9 and are preferably amplified in an interposed pulse power amplifier 11 (FIGS. 1, 4). Thus, the pulses from sensing location 6 pass through the line 12a (FIG. 1) to the amplifier 11 and thence to the counter 9, whereas the pulses from sensing location 5 pass through a different line 12b to the amplifier 11 before they reach the counting mechanism 9.

Interposed in the line 11b (FIG. 1), and consequently between the counter 9 and the sensor 5 closer to the marking device 3 than the sensor 6, is a frequency divider 13 which takes care that whenever the shorter measuring distance is switched into operation, an actuation of the counter 9 is not produced by each sensing pulse but only by a given fraction of the counted number of pulses, this fraction corresponding to the length ratio of the two measuring distances. In the illustrated example, the sensor 5 is assumed to be spaced 100 mm. from the marking device 3, and the sensor 6 is spaced 1000 mm. Consequently the frequency divider 13 must have a division ratio of 10:1 because only each tenth pulse from sensor 5 must cause the counter 9 to advance one step.

Frequency dividers for such performance are generally known. Common examples are counting mechanisms in which a decade is advanced one step each time the preceding decade is fully counted. Such mechanism are employed, for example, in automobile mileage counters, cash registers and the like, except that for the purposes of apparatus according to the present invention shown in FIG. 1 only two decades and consequently a single tens-transfer is necessary. However, the frequency divider for the purpose of the invention can be given any other suitable design. It is particularly preferable to use an electrical frequency divider, such as the one exemplified by the circuit diagram shown in FIG. 3 and described presently.

Figure 2:
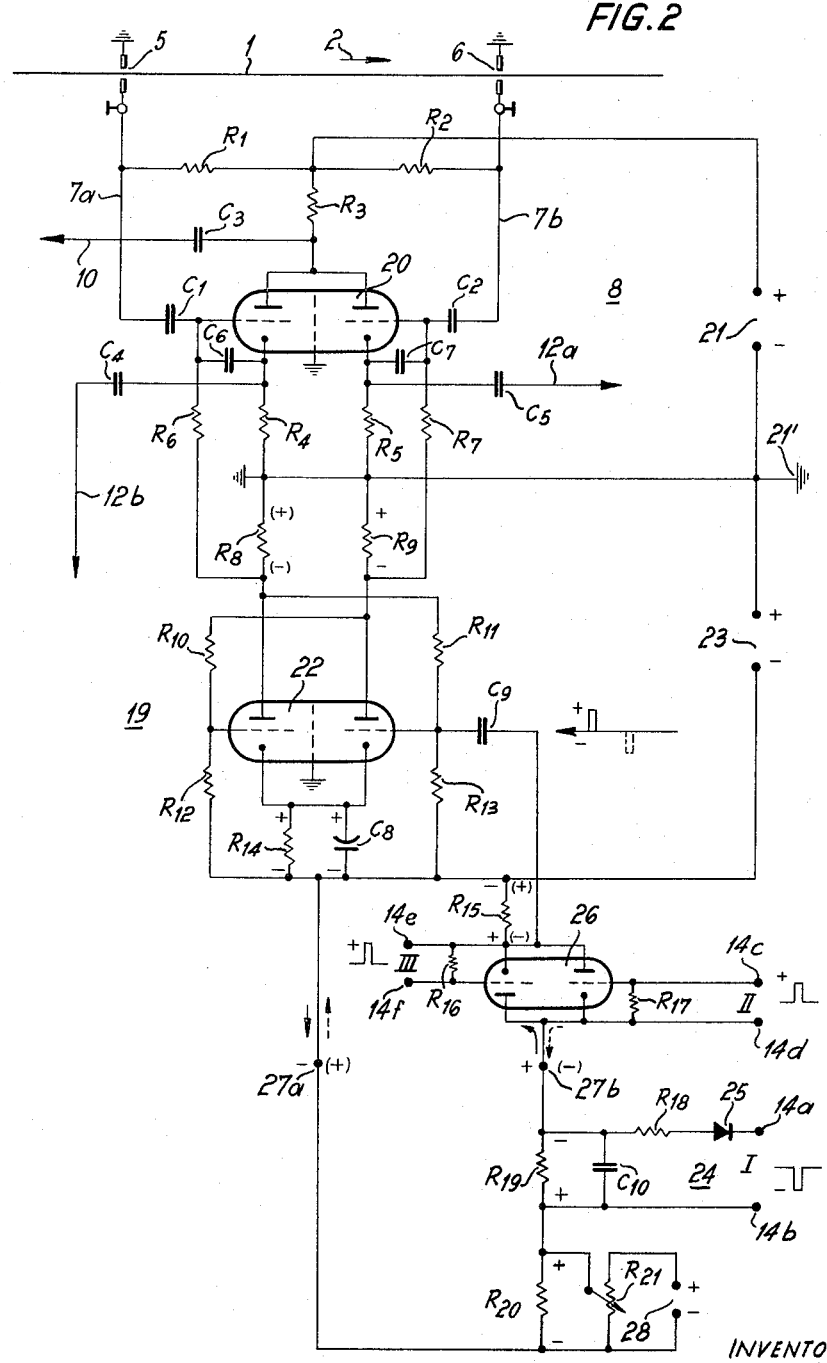

Indicated at the left of FIG. 3 is the line 12b which leads to the selector switch 8, according to FIG. 1 (or FIG. 2). Indicated in the lower right-hand corner of FIG. 3 is the line 13b which leads to the pulse amplifier 11 shown in FIG. 1 (and FIG. 4). The frequency dividing member proper consists of an electronic counting tube 130 with ten cathodic contacts $k0, k1 \ldots k9$. Upon receiving a single pulse, the tube switches its discharge from the preceding to the next following cathode contact. When thus the contact $k9$ is reached, an output pulse is passed through the line 13b to the pulse amplifier 11. The illustrated pre-amplifying transistor circuits shown in FIG. 3 between the signal input lead 12b and the control circuit of the tube 130 are conventional.

In FIG. 4, showing the circuit diagram of the pulse amplifier 11, the amplifier input leads 12a and 13b according to FIG. 1 will be recognized in the left lower and right upper portion of FIG. 4. The output connection of the amplifier 11 which serves for controlling the selector switch 8, while being collectively denoted in FIG. 1 by 14 ($a$ to $f$), actually comprises six separate leads which are individually shown in FIG. 4 at 14a through 14f respectively and which form part of three output circuits I, II and III. Further reference to the diagram of FIG. 4 will be made in the following.

As explained, the pulses from sensors 5 and 6 are selectively applied to the counter 9 through the pulse amplifier 11 which also controls the selector switch 8 in such a manner that, depending upon the travel speed of the thread 1, only the pulses from sensor 5 or only those from sensor 6 are employed for controlling the counter 9 and the pulse generator 4. Such control of the switch 8 is effected through the above-mentioned leads 14a to $f$ which supply to the selector switch 8 the same number of pulses as are supplied to the counter 9. This will be more fully understood from the following description of the embodiment of a suitable selector switch 8 illustrated in FIG. 2.

Indicated in FIG. 2 are the running thread 1 and the two sensors 5 and 6 which respond to any ionization marks applied to the thread. As mentioned, the selector switch is to operate in such a manner that only the pulses of a single sensor will reach the counter 9 and the pulse generator 4. This switching function is performed by a correspondingly controlled tube 20. The tube circuit is energized from a current source, connected to terminals at 21, whose negative pole is grounded at 21' and whose positive pole is connected through respective high-ohmic resistors R1 and R2 to the two sensors 5 and 6. When an ionized thread locality reaches, for example, the metal plates of sensors 5, a current pulse from source terminals 21 passes through resistor R1 and through the ionized air gap between the metal plates of sensor 5 to the grounded negative pole 22'. This produces in resistor R1 a voltage drop which has also the characteristic of a pulse. This pulse voltage at resistor R1 acts through a capacitor C1 upon the control grid in the left-hand electrode system of the tube 20. In the same manner, a voltage-drop pulse at resistor R2 is caused when the ionized spot of the thread passes between the metal plates of sensor 6. This pulse acts through a capacitor C2 upon the control grid in the right-hand electrode system of tube 20.

The voltage pulses thus passing through the capacitor C1 or C2 to the control grid of the left or right electrode system of tube 20 render the corresponding system conductive so that a plate-current pulse flows from the negative pole 21' of current source through resistor R4 or R5 and a common anode resistor R3 to the positive terminal 21. This current pulse is applied through a capacitor C3 and a lead 10 (FIGS. 2, 1) to the pulse generator 4 thus releasing a new ionizing marking pulse to act upon the running thread 1.

Now, each of the marking pulses on thread 1 is supposed to cause only one of the two sensors 5, 6 to pass a releasing pulse to the marking-pulse generator 4. Consequently, either the left electrode system or the right system of tube 20 must be blocked at a time. In the embodiment of the switching stage shown in FIG. 2, the selective control of the switching operation is effected by a bistable flip-flop network 19, composed of a tube 22, resistors R10, R11, R12, R13, R14 and a capacitor C8. The flip-flop network is energized at terminals 23 from a plate-current source which is reversely poled with respect to the source at 21; that is the positive pole at 23 is grounded, whereas the negative pole is connected through the resistor R14 to the cathodes of tube 22.

As mentioned, the switching stage is to be controllable in dependence upon the pulse sequence frequency, i.e. the number of counting pulses per unit time. This requires that the bistable flip-flop network 19 be controlled also in dependence upon the pulse-sequence frequency. This, in the illustrated embodiment, is done by an electrical integrating member 24 composed of resistors R18 and R19, a capacitor C10 and a diode 25. The integrating member 24 is energized from the pulse power amplifier 11 (FIGS. 1, 4) through the two leads 14a, 14b by negative pulses, while two other leads 14c and 14d apply positive pulses to the right-hand system of a control tube 26, and a third pair of leads 14e, 14f passes positive pulses to the left-hand electrode system of the tube 26. The line 14 ($a$ to $f$) shown in FIG. 1 to extend from the pulse amplifier 11 to the switch 8 is thus capable of transmitting three separate pulses in the three mutually isolated pulse circuits I, II, III (FIG. 4) which in the illustrated embodiment are shown connected to three separate secondary windings 141, 142, 143 of a pulse transformer 140.

The switching stage and control circuits according to FIG. 2 operate as follows.

Assume that the thread 1 travels at slow speed. As far as the operation of the pulse counter 9 (FIGS. 1, 4) is concerned, it is of no concern whether the pulses being counted originate in sensor 5 or in sensor 6 because the control of the switching stage is subject only to those numbers of pulses that are applied to the counter 9. That is, when the thread travels at slow speed and the sensor 5 passes pulses to the counter 9, this counter receives only few pulses per unit time because of the operation of the frequency divider 13 interposed between counter 9 and sensor 5. Consequently, only few pulses per unit time pass through leads 14a and 14b. These negative pulses are applied through diode 25 and resistor R18 to the capacitor C10 which discharges through the resistor R19. Depending upon the counted pulses per unit time, and consequently depending upon the pulse-sequence frequency, the capacitor C10 becomes more or less charged since the discharging period of this capacitor through resistor R19 is constant. As a result, the voltage drop of resistor R19 represents a pilot voltage which varies with the pulse-sequence frequency.

The varying pilot voltage at resistor R19 is electrically compared with a normally constant reference voltage at a resistor R20. The resistor R20 is connected through an adjustable control resistor R21 to a current source 28 of constant voltage, and the resistor R21 is so set that the current passing through resistor R20 produces in that resistor a reference voltage of the desired, normally constant value.

The just-mentioned voltage comparison will be explained with reference to the diagram of FIG. 5. Assume for example, that the reference voltage at resistor R20 is adjusted to 30 volts. In the upper portion of FIG. 5 it is assumed that the voltage drop of resistor R19 furnishes an integrated pilot voltage of 10 volts. As is apparent from the polarity indications in FIG. 5, the reference voltage from resistor R20 is series-opposed to the integrated voltage from resistor R19. Now, when the integrated voltage at resistor R19 is small (in the example: 10 volts) because the thread runs at slow speed and only few pulses per unit time are thus transmitted to the integrating member 24, then the comparison results in a positive difference voltage of 20 volts, corresponding to the polarity designation entered at terminals 27a and 27b in FIG. 2.

However, if the thread running speed is high so that many pulses per time unit are transmitted, the integrated pilot voltage at resistor R19 increases correspondingly. In the lower portion of FIG. 5 it is assumed that in this case the pilot voltage at resistor R19 is 50 volts. Since this voltage is series-opposed to the 30 volt reference voltage at resistor R20, a difference voltage of 20 volts results between the terminal points 27a and 27b (FIG. 2), but now the difference voltage has a polarity opposed to that obtaining at slow thread running speed, the opposed polarities being indicated in parentheses (FIG. 2). The two electrode systems of tube 26 are connected in antiparallel relation to each other so that each time only the one system is turned on (made conductive) in which the anode receives the positive potential and the cathode the negative potential.

It has been initially assumed in the foregoing example that the thread runs at slow speed so that only few pulses per unit time are applied to the integrating member 24 and causes a relatively small voltage drop to occur at resistor R19. In this case, as shown by the polarities at the terminal points 27a and 27b outside of the parentheses, the anode of the left electrode system in tube 26 is positive and the cathode of the left system receives a negative potential through resistor R15. Now the left electrode system in tube 26 is in operating condition. Simultaneously the right electrode system is non-conductive because its anode is connected to a negative potential and the cathode has a positive potential. A positive pulse applied through leads 14c and 14d to the right electrode system of tube 26 is thus incapable of making this system conductive. In contrast thereto, the left electrode system of tube 26, in which the correct polarities are applied to anode and cathode, is switched on when a voltage pulse is applied to the grid through leads 14e and 14f. Plate current can then flow through the resistor R15 and produces in resistor R15 a voltage drop of the polarity distribution shown in FIG. 2. As a result, a positive voltage pulse is passed through the capacitor C9 to the bistable flip-flop network 19.

When the thread-running speed is high and the pulse-sequence frequency is consequently also high, the voltage drop at resistor R19 (pilot voltage) is larger than the reference voltage at resistor R20 (see FIG. 5). Then the voltage potentials at terminal points 27a and 27b (FIG. 2) become reversed, as indicated in parentheses. As explained, the reverse polarity has the result the left electrode system of tube 26 is turned off, while the right system assumes operative condition. When now a positive pulse is applied through the leads 13e and 13f to the grid of the left system in tube 26, this system cannot be turned on, because its anode has a negative potential and the cathode a positive potential. However, a grid voltage pulse applied through lead 14c and 14d to the grid of the right system in tube 26 will now cause this system to be turned on. When this occurs, the resulting voltage drop in resistor R15 possesses reverse polarity in accordance with the polarity indications shown in parentheses. Thus a negative voltage pulse is supplied through capacitor C9 to the flip-flop network 19.

It will be understood from the foregoing that depending upon the travel speed of the thread and consequently in dependence upon the sequence frequency of the counted pulses, the bistable flip-flop network 19 receives through capacitor C9 either a positive or a negative voltage pulse. As explained, the two anodes of tube 22 are connected through respective resistors R8 and R9 with the positive pole of the current source 23, whereas the cathodes are connected through resistor R14 to the negative pole. A positive voltage pulse produced at resistor R15 and passing through capacitor C9, thus produces in resistor R13 a voltage drop which makes the grid voltage of the right electrode system in tube 22 more positive so that this system is conductive. Accordingly, plate current from the current source at 23 flows through the right system in tube 22 and through the resistor R9. This current causes in resistor R9 a voltage drop of the polarity entered in FIG. 2 at resistor R9. This voltage drop reduces at the voltage divider R10, R12 the positive grid voltage in the left electrode system of tube 22 to such an extent as to produce a trigger action. The left system is turned off and the right system remains turned on until a negative pulse initiates the reverse triggering operation. The negative voltage drop at resistor R9 is further applied through resistor R7 to the control grid in the right electrode system of switching tube 20, so that this system is likewise turned off.

In accordance with the bistable switching operation of the flip-flop network, only one system turned on at a time. As explained, the positive voltage passing through capacitor C9 causes the right system of tube 22 to be turned on, so that the left system of tube 22 is turned off. However, when the left system of tube 22 is turned off, no voltage drop is produced in resistor R8 because no current flows in the anode circuit of the left system of tube 22. Consequently the grid in the left system of tube 20 does not receive a negative blocking voltage, and this system remains turned on.

It will be recognized, that when the thread travel speed and the corresponding pulse-sequence frequency are low, the marking pulses passing through the sensing location 6 have no effect upon the integrating member 24 because the right electrode system of tube 20 is non-conducting due to the high negative voltage then applied to the control grid. Only the marking pulses on thread 1 that pass through the location on sensor 5, can control the left system of tube 20 so that a control pulse passes through capacitor C3 and lead 10 to the pulse generator 4, with the result that a new marking pulse is applied to the thread 1. Simultaneously the voltage drop produced by the anode current of the left system in the resistor R4 and also constituting a pulse, is supplied through the capacitor C4 and the lead 12b to the frequency divider 13 (FIGS. 1, 3).

It has been assumed in the foregoing explanation that the thread travels at slow speed. At high speed, the high pulse-sequence frequency applied to the integrating member 24 has the effect, mentioned above, that a negative voltage pulse is passed through the capacitor C9 to the flip-flop network 19. As a result of this negative pulse, the right electrode system of tube 22 is turned off. This increases the positive voltage at voltage divider R10–R12, so that the left system of tube 22 is turned on and passes plate current through the resistor R8. The resulting voltage drop of resistor R8 reduces the voltage at the voltage divider R11–R13, and the positive voltage applied to the grid of the right system drops below a minimum value and thus below the positive voltage at the cathode capacitor C8. The right system, therefore, remains blocked after the pulse passing through the capacitor C9 is terminated.

Relative to the tube 20, the voltage drop of resistor R8 is negative and is applied through resistor R6 to the grid in the left electrode system of tube 20, thus blocking the left system. Since now the voltage drop at resistor R9 is eliminated so that the negative bias voltage is removed from the control grid in the right system of tube 20, this right system can now be controlled by a pulse furnished from sensor 6. Thereafter, the plate-current pulses produce in resistor R3 a voltage drop which acts through capacitor C3 and lead 10 to control the high-voltage pulse generator 4. At the same time, the voltage drop caused by the plate-current pulses in resistor R5 is applied through capacitor C5 and lead 12a to the amplifier 11 (FIGS. 1, 4) and thus also to the counting mechanism 9. In this manner, the counting and marking operations are now controlled only by pulses sensed by the sensor 6.

It will be understood that the invention is not limited to the embodiment exemplified by the illustrations. For example, the method and apparatus according to the invention are applicable not only for measuring the length of textile thread, such as individual filaments or arrays of threads, but also for measuring the length of fibrous or textile materials in general. For example, the invention is analogously applicable for measuring the length of webs of textile fabric or paper. As mentioned, instead of producing electrically active markings on thread 1 by ionization, electrostatic charges may also be produced by other means, or isotopes or other self-expiring markings can be applied as well. The circuitry employed for the purposes of the invention can also be modified in various respects. For example the electrically active charge on the thread, when passing through the sensing location 5 or 6, can be directly utilized by applying the resulting pulse directly through the capacitor C1 or C2 to the control grids of the tube 20, in which case, for example, the resistors R1 and R2 need not be used. Transistor circuitry and other semiconductor components may be used instead of the electronic tube devices shown.

When employing radioactive isotopes at the mark-applying location, such isotopes may be employed either for ionizing the thread locally in order to produce electrically active markings to be read out substantially in the same manner as described above, or radioactive isotopes can be applied in minute traces directly to the thread, and the sensing can then be effected by radioactive tracer techniques generally known for industrial and biological purposes.

A suitable way of applying minute quantities of isotope substance to the thread is to use a radioactive liquid or solution of a radioactive element and releasing each time, preferably electrically, a fine, limited spray or vapor of fine distribution and in such a minute quantity as to produce no discernible wetting of the marked spot. The spot then possesses sufficient radioactivity to permit sensing by means of scintillation devices, Geiger counters and other gauges used in tracer techniques. Each initial response to a sensitized spot is then used to trigger an electronic system analogous to the one described.

When thus preparing the method with the aid of isotopes the half-life of the radioactive element used is not critical as long as the isotope applied to the thread remains effective during the interval of time in which the marking locality passes from the marking location through the sensing location or all of the sensing locations, except the half-life should not be excessive so that the radioactivity has substantially expired after the thread or the material made therefrom is subjected to manual handling. Suitable isotopes for such purposes are, for example: Tl 210 (1.3 min), Po 218 (3 min), Tl 208 (3.1 min) Tl 207 (4.8 min), Bi 214 (20 min), Pb 214 (27 min), Bi 212 (60 min).

Upon a study of this disclosure, it will be obvious to those skilled in the art, that my invention is amenable to a great variety of modifications and hence can be given embodiments other than particularly illustrated and described herein, without departing from the essential features of my invention and within the scope of the claims annexed hereto.

I claim:

1. The method of measuring the length of textile thread material travelling on a given path, which comprises applying discrete fugitive and self-expiring markings at a distance from each other along the material by adding one of said markings at a given location of the path each time the preceding marking has travelled said distance, increasing and decreasing said distance in dependence upon increased and decreased running speeds respectively of the material, sensing and counting the number of applied markings passing by the end of said distance per unit time.

2. The method of measuring the length of running textile thread material, which comprises applying a self-expiring marking locally to the material whenever the preceding marking has travelled a selected measuring distance, sensing the applied markings at a selected one of a plurality of sensing localities which determine respectively different measuring distances, and selecting one of said distances in dependence upon the running speed, to have said selected distance larger at high speed than at low speed of the material, and sensing and counting the number of markings sensed per unit time at the selected locality.

3. The length measuring method according to claim 2 which comprises switching to a predetermined longer measuring distance when the speed passes beyond a predetermined value, and switching to a predetermined shorter distance when the speed drops below a predetermined value.

4. The method of measuring the length of running textile thread material, which comprises applying discrete fugitive and self-expiring markings at a distance from each other along the material by adding one of said markings at a given location when the preceding marking has travelled said distance, increasing and decreasing said distance in dependence upon increased and decreased running speeds respectively of the material, the ratio of increased to decreased distance being an integer, sensing the applied markings at the end of said measuring distance, and counting the number of sensed markings per unit time as indicative of the measured length.

5. The length measuring method according to claim 4, wherein only an integral fraction of the number of sensed markings is counted when a shorter measuring distance is effective, said fraction corresponding to the inverse value of said distance ratio.

6. Apparatus for measuring the length of textile material running along a given path, comprising marking means for applying discrete fugitive marks locally to the material, said marking means being located at a marking point of said path, a plurality of sensors proximity-responsive to said applied marks and located near said path at respectively different distances from said point, a counting device, control means connected to said counting device and comprising selector means for selectively connecting one of said sensors to said counting device for controlling said device in dependence upon the marks sensed by said selected one sensor at a time, said control means being also connected to said marking means for simultaneously controlling said marking means to apply a new mark when a preceding mark is sensed by said one sensing means, whereby the number of markings per unit time counted by said device is indicative of the measured length.

7. Apparatus for measuring the length of running textile material according to claim 6, comprising a frequency divider interposed between said counting device and a first one of said sensing means spaced from said point a shorter distance than a second, more remote one of said sensing means, whereby said counting device responds to a given fraction of the number of markings sensed by said first sensing means.

8. Apparatus for measuring the length of textile material running along a given path, comprising electric marking means located at a marking point of said path for locally applying discrete electric charges to the running material, a plurality of electric-field responsive sensors located near said path at respectively different distances from said point for response to said marking charges on the running material as the charges pass by said sensors, a counting device, control means connected to said counting device and comprising selective switching means for selectively connecting one of said sensors to said counting device for controlling said device in dependence upon the charges sensed by said selected one sensor at a time, said control means being also connected to said marking means for simultaneously controlling said marking means to apply a new marking charge when a preceding charge is sensed by said one sensing means, whereby the number of markings per unit time counted by said device is indicative of the measured length.

9. In apparatus for measuring the length of running textile material according to claim 8, said control means comprising electric comparator means connected to said switching means and to said counting device for controlling said switching means in dependence upon a given value of the sequence frequency of the counted marking charges.

10. In apparatus for measuring the length of running textile material according to claim 9, said control means comprising a bistable flip-flop network connected with said switching means for controlling said switching means to select one of two respective sensors, said network having a control circuit connected to said comparator to be controlled thereby.

11. In apparatus for measuring the length of running textile material according to claim 9, said comparator comprising a voltage integrating member having an integrated voltage depending upon said sequence frequency, a source of adjustable reference voltage in series-opposed connection with said integrated voltage, and output leads for providing a difference voltage dependent upon both said integrated and reference voltages, said output leads being connected with said flip-flop control circuit, whereby said difference voltage controls said flip-flop network and thereby also said switching means for sensor selection.

References Cited by the Examiner
UNITED STATES PATENTS 2,488,277   11/1949   Falk et al. _____ 33—127 X
2,989,690    6/1961   Cook _____ 73—159 X DAVID SCHONBERG, *Primary Examiner.*